(12) United States Patent
Singh et al.

(10) Patent No.: US 12,536,640 B2
(45) Date of Patent: Jan. 27, 2026

(54) BARE METAL WITH CONVERGED NETWORK INTERFACE CONTROLLER (NIC) WITH AUTOMATED IMAGE QUALIFICATION SERVICE WITHIN INFRASTRUCTURE AS SERVICE (IaaS) ENVIRONMENT

(71) Applicant: Oracle International Corporation, Redwood Shores, CA (US)

(72) Inventors: Brijesh Singh, Mercer Island, WA (US); Eden Adogla, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 531 days.

(21) Appl. No.: 18/053,170

(22) Filed: Nov. 7, 2022

(65) Prior Publication Data

US 2024/0153060 A1 May 9, 2024

(51) Int. Cl.
*G06T 7/00* (2017.01)
(52) U.S. Cl.
CPC ............. *G06T 7/0004* (2013.01); *G06T 7/00* (2013.01); *G06T 2207/30184* (2013.01); *G06T 2207/30204* (2013.01)
(58) Field of Classification Search
CPC ......... G06T 7/0004; G06T 2207/30184; G06T 2207/30204
See application file for complete search history.

(56) References Cited

U.S. PATENT DOCUMENTS

| | | | |
|---|---|---|---|
| 7,594,219 B2 * | 9/2009 | Ramachandran | ......... G06F 8/65 717/124 |
| 9,851,996 B2 * | 12/2017 | Kochar | ................... G06F 8/654 |
| 11,137,992 B2 | 10/2021 | Arif et al. | |
| 11,340,881 B2 | 5/2022 | Gondi et al. | |

(Continued)

FOREIGN PATENT DOCUMENTS

WO    2022108676 A1    5/2022

OTHER PUBLICATIONS

"Bare Metal Boot Options", Progress Kemp, Available Online at: https://support.kemptechnologies.com/hc/en-us/articles/207797043-Bare-Metal-Boot-Options, Jun. 24, 2022, 4 pages.

(Continued)

*Primary Examiner* — Tammara R Peyton
(74) *Attorney, Agent, or Firm* — Kilpatrick Townsend & Stockton LLP

(57) ABSTRACT

The present disclosure is directed to devices and techniques for auto-qualifying images on new hardware or infrastructure configurations. The systems and methods include initiating an auto-qualification process for pre-testing one or more images registered within a bare metal system having one or more new infrastructure configurations, discovering all of the one or more images registered for use within the bare metal system, booting each of the one or more registered images into an isolated infrastructure having the one or more new infrastructure configurations, probing instances of each of the one or more registered images booted on the isolated infrastructure to determine stability of each of the (Continued)

one or more registered images on the one or more new infrastructure configurations, and marking each of the one or more registered images as stable or unstable.

14 Claims, 9 Drawing Sheets

(56) References Cited

U.S. PATENT DOCUMENTS

| | | | |
|---|---|---|---|
| 11,442,848 B1* | 9/2022 | Crenshaw | G06F 11/3495 |
| 2003/0023839 A1 | 1/2003 | Burkhardt et al. | |
| 2015/0244574 A1 | 8/2015 | Pirko | |
| 2015/0309829 A1 | 10/2015 | Hiltgen et al. | |
| 2020/0125662 A1 | 4/2020 | Zhu et al. | |
| 2020/0387357 A1* | 12/2020 | Mathon | G06F 9/4411 |
| 2021/0226846 A1 | 7/2021 | Ballard et al. | |
| 2023/0011452 A1 | 1/2023 | Barber et al. | |
| 2023/0350670 A1* | 11/2023 | Kuehnel | G06F 9/4408 |

OTHER PUBLICATIONS

"Bare Metal Tests and Hardware-Software Co-Verification", Available Online at: https://community.cadence.com/cadence_blogs_8/b/sd/posts/bare-metal-tests-and-hardware-software-co-verification, Jan. 23, 2017, 3 pages.

"Hardware Features Available with Virtual Machine Compatibility Settings", VMware vSphere, Aug. 6, 2021, 4 pages.

"Troubleshoot Live Migration Issues", Available Online at: https://docs.microsoft.com/en-us/troubleshoot/windows-server/virtualization/troubleshoot-live-migration-issues, Dec. 1, 2021, 22 pages.

"Virtual Machine Compatibility", VMware vSphere, Aug. 6, 2021, 4 pages.

Flecha, "Hardware Compatibility Checks in vLCM", VMware Virtual Blocks Blog, Jun. 11, 2020, 4 pages.

U.S. Appl. No. 18/307,727, Final Office Action mailed on Mar. 13, 2025, 18 pages.

U.S. Appl. No. 18/307,727, Non-Final Office Action mailed On Aug. 13, 2024, 14 pages.

* cited by examiner

BARE METAL WITH CONVERGED NETWORK INTERFACE CONTROLLER (NIC) WITH AUTOMATED IMAGE QUALIFICATION SERVICE WITHIN INFRASTRUCTURE AS SERVICE (IaaS) ENVIRONMENT

FIELD

The present disclosure relates generally to an automated image qualification service, and more particularly, to techniques for providing an automated image qualification service within an Infrastructure as a Service (Iaas) environment.

BACKGROUND

Infrastructure as a Service (Iaas) is a cloud computing service model through which computing resources are hosted in a public, private, or hybrid cloud to be accessed and utilized by various users. There are many different implementations of hardware that can be used to provide IaaS. For example, a combination of dedicated servers, virtual servers, and bare metal servers can be used to provide IaaS. Different hardware may be used depending on a user's circumstances and can vary depending on the user's desired customization, complexity, cost, etc.

Bare metal servers are often a desirable implementation that provides servers that are configured as single-tenant machines that deliver hardware with complete user access to storage, networking, etc. The access is made possible because bare metal servers do not rely on a hypervisor layer to create separate virtual machines (VMs). The bare metal servers eliminate the need for virtual layers by allowing users to install their preferred operating system directly on the bare metal server. Bare metal servers typically provide configurations with leading edge hardware, including but not limited to the newest generation processors, memory, storage devices, etc., with high-speed performance access. Bare metal servers also enable a user to configure the server hardware (e.g., processor, storage, memory, etc.) to their preferences because it is not shared with other users. Users can also implement any combination of software on the dedicated servers such as operation systems, applications, tools, etc.

Over time, various hardware elements within an infrastructure as a service (IaaS) environment fail, are replaced, and/or are upgraded with newer hardware elements. Replacements or upgrades can include updating swapping an old hardware with a new version of the same hardware or different hardware that performs the same or similar functionality. However, users may have configured one or more of their settings to the old hardware, such that the user's configuration (e.g., an image) may not operate or operate as intended when hardware is changed or replaced/upgraded. If the images are not compatible with a new hardware configuration (or hardware shape), then the user's system could hang-up, crash, get caught in a reboot loop, or otherwise malfunction. Similarly, when hardware within the bare metal server includes one or more shared infrastructures (e.g., a converged network interface controller (NIC)) that is used by both the server itself and the user using the server, it can cause issues when that shared hardware fails to operate or is replaced. For example, shared hardware can experience a failure mode where a destabilized smart NIC also destabilizes the user's operating system, which can cause the bare-metal instance operating system to hang or crash.

When deploying a new bare metal server, it can take additional time to spin up when compared to other systems, such as a virtual machine server which can spin up quickly. Therefore, if changes are made to the bare metal server that require updates to a user's configuration to operate properly, this can cause significant downtime. Additionally, bare metal servers may require additional testing periods to ensure that the configuration(s) provided by a user operate properly. Unexpected hardware failures or destabilizations can compound any delays when new hardware or hardware configurations need to be introduced to the bare metal server to address the failure or destabilization.

SUMMARY

In a bare metal system, shared infrastructure can create a failure mode where a destabilized shared infrastructure (e.g., converged NIC) can also destabilize a customer's workload operating system. The present disclosure provides systems and methods to address such issues. In the bare metal system of the present disclosure, every bare-metal image ever registered, or a curated subset, is discovered and booted into an isolated environment onto a server that has the shared infrastructure (e.g., converged NIC). Thereafter, the systems and methods of the present disclosure can probe to see if the running instance achieves full boot, connectivity, and stability. If the image fails to boot completely, the image can be blacklisted to prevent placement of instances of that image and prevent placement of instances of that image on the shared infrastructure (e.g., converged NIC hardware). This process provides an auto-qualification of an image for specific hardware using techniques for pre-testing and pre-certifying customer images for use with an IaaS system. Pre-tests, however, can be lengthy when performed on-the-fly as issues arise, and could result in lengthy downtime for the customer. When a shared hardware causes guest destabilizations/hangs/crashes to occur the present disclosure provides methods and systems that auto recover.

In various embodiments, a method is provided. The method includes initiating, by a bare metal system, an auto-qualification process for pre-testing one or more images registered within a bare metal system having one or more new infrastructure configurations, discovering, by the bare metal system, all of the one or more images registered for use within the bare metal system, and booting, by the bare metal system, each of the one or more registered images into an isolated infrastructure having the one or more new infrastructure configurations. The method also includes probing, by the bare metal system, instances of each of the one or more registered images booted on the isolated infrastructure to determine stability of each of the one or more registered images on the one or more new infrastructure configurations and marking, by the bare metal system, each of the one or more registered images as stable or unstable.

In some embodiments, the initiating of the auto-qualification process is in response to a detection of the one or more new infrastructure configurations introduced into the bare metal system. The one or more new infrastructure configurations can include a converged network interface controller (NIC). The isolated infrastructure can be part of a Virtual Cloud Network (VCN). The VCN can include a dedicated pool of hardware for the auto-qualification process. Images identified as unstable can be added to a blacklist that prevents placement of instances of the images identified as unstable from being run on the one or more new infrastructure configurations. The method can further include patching, by the bare metal system, each of the one or more registered images identified as unstable.

In various embodiments, a system is provided. The system includes one or more processors and a memory coupled to the one or more processors, the memory configured to store a plurality of instructions executable by the one or more processors. The plurality of instructions cause the one or more processors to at least initiate an auto-qualification process for pre-testing one or more images registered within a bare metal system having one or more new infrastructure configurations, discover all of the one or more images registered for use within the bare metal system, and boot each of the one or more registered images into an isolated infrastructure having the one or more new infrastructure configurations. The plurality of instructions also cause probing instances of each of the one or more registered images booted on the isolated infrastructure to determine stability of each of the one or more registered images on the one or more new infrastructure configurations and marking each of the one or more registered images as stable or unstable.

In some embodiments, the initiating of the auto-qualification process is in response to a detection of the one or more new infrastructure configurations introduced into the bare metal system. The one or more new infrastructure configurations can include a converged network interface controller (NIC). The isolated infrastructure can be part of a Virtual Cloud Network (VCN). The VCN can include a dedicated pool of hardware for the auto-qualification process. Images identified as unstable can be added to a blacklist that prevents placement of instances of the images identified as unstable from being run on the one or more new infrastructure configurations. The system can further include patching each of the one or more registered images identified as unstable.

In various embodiments, a non-transitory computer-readable memory storing a plurality of instructions executable by one or more processors is provided. The plurality of instructions include initiating, by a bare metal system, an auto-qualification process for pre-testing one or more images registered within a bare metal system having one or more new infrastructure configurations, discovering, by the bare metal system, all of the one or more images registered for use within the bare metal system, and booting, by the bare metal system, each of the one or more registered images into an isolated infrastructure having the one or more new infrastructure configurations. The plurality of instructions also include probing, by the bare metal system, instances of each of the one or more registered images booted on the isolated infrastructure to determine stability of each of the one or more registered images on the one or more new infrastructure configurations and marking, by the bare metal system, each of the one or more registered images as stable or unstable.

In some embodiments, the initiating of the auto-qualification process is in response to a detection of the one or more new infrastructure configurations introduced into the bare metal system. The one or more new infrastructure configurations can include a converged network interface controller (NIC). The isolated infrastructure can be part of a Virtual Cloud Network (VCN) comprising a dedicated pool of hardware for the auto-qualification process. Images identified as unstable can be added to a blacklist that prevents placement of instances of the images identified as unstable from being run on the one or more new infrastructure configurations. The non-transitory computer-readable memory can further include patching, by the bare metal system, each of the one or more registered images identified as unstable.

DETAILED DESCRIPTION

Figure 1:
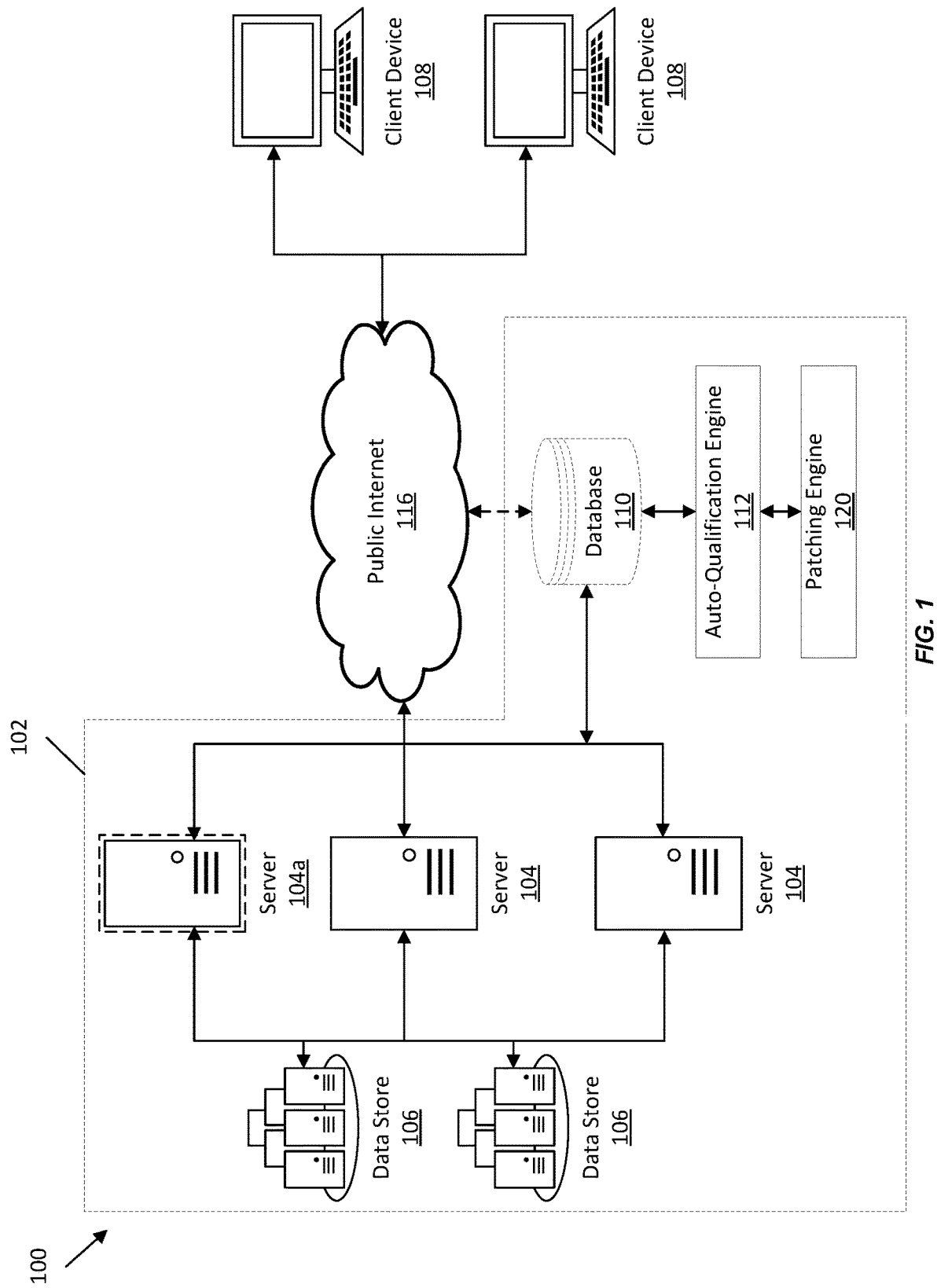
FIG. 1 is a block diagram illustrating a system for implementing the present disclosure, according to at least one embodiment.

The present disclosure is designed for improving operation of Infrastructure as a Service (IaaS), specifically reducing or eliminating failures due to the replacement and/or malfunction of hardware elements supporting the IaaS. The present disclosure discusses example implementations and embodiments related to IaaS using a bare metal system; however, it could be implemented in any combination of systems.

As hardware goes through generational changes, when used in an IaaS system, there is a need to periodically refresh infrastructure/hardware components to provide customers with the best possible performance. Periodic refreshes may include replacing all components with newer and more performant next generation hardware. Periodic refreshes can also include the need to use different components for the physical servers providing similar functionality to previous configurations, such as replacing an Intel SSD with a Samsung SSD to maintain vendor diversity. Periodic refreshes may further include implementing hardware to enable switching from discrete components to a converged infrastructure to save cost and create space in the server chassis.

When updating or replacing infrastructure components in a bare metal system (or other IaaS system); however, issues can arise depending on how the IaaS system is being utilized by the customer. For example, in bare metal systems, a customer's operating system, running on a server within the bare metal system, may not be compatible with the updated infrastructure. This potential incompatibility may cause the customer's system to operate in a manner that is unsatisfactory, cause a failure, crash, or boot loop, or stop running entirely. The use of converged infrastructure components can also lead to similar issues. Converged infrastructure includes components that are being used by both the host system and are provided virtually for customer usage as part of the IaaS system. For example, a bare metal server can hang or crash due to manifestation of bugs in a converged infrastructure platform that manifest in the form of a host operating system hang or crash.

Sometimes, IaaS server providers will assign new "instance types" or "shapes" to the newer generation hardware to help customers know there are differences. Sometimes, the change is perceived to be low-risk enough to not warrant introducing a new shape/instance-type value that a customer can select to target the new configuration. For example, it is not unreasonable for a customer to expect that their x86_64 image that run successfully on 9th Generation Sky Lake CPU should run unmodified on a 10th generation Coffee Lake CPUs. However, if the IaaS server provider introduced a new server component that doesn't have the right drivers in the old image, the customer either has to test the old image on the new server configuration first to know for a fact that it will work, or we would need something like the Auto-qualification Service to determine if it will work.

There is a need to avoid customer downtime when new hardware is being provided or existing hardware malfunctions cause the need to switch a customer to a hardware configuration, for example, a different bare metal server. The present disclosure provides systems and methods to perform auto qualification of images (e.g., operating system images), running on the IaaS system, for new and specific hardware configurations. The auto-qualification can include pre-testing and pre-certifying customer images for use with a new hardware configuration prior to the new hardware configuration being made generally available to customers. Updates to a hardware configuration can include any hardware that becomes visible to customer, which can include all or part of converged infrastructure. In accordance with some embodiments of the present disclosure, the auto-qualification of an image can be performed by crawling through and discovering every image (hard disk copies) registered by customers and booting each image onto a server that has the new hardware configuration. Once booted, the system can probe to see if the running instance achieves full boot, connectivity and stability without crash or hang up (e.g., kernel crash). The results of the pre-test can be marked as stable or unstable, depending how each image performs on the new hardware configuration. If the image is unstable or fails to boot completely, that image can be blacklisted so that the system prevents placement of instances of that image on the new hardware configuration. Therefore, if the blacklisted image(s) that are not compatible to operate on the new hardware configuration, the blacklisted image(s) will not be exposed to the risk of a hard hand/crash or end up in a reboot loop because the intended remediation from a reboot does not work.

Referring to FIG. 1, an illustration of an example system 100 for us in accordance with the present disclosure is depicted. In some embodiments, the system 100 includes a bare metal system 102 having one or more servers 104 and one or more data stores 106 for providing IaaS services to one or more client devices 108. The bare metal system 102 can be a combination of hardware and software configured to carry out aspects of the present disclosure. Although not depicted, the bare metal system 102 can include one or more components for managing the IaaS and allocating one or more servers 104 for use by the users (e.g., IaaS customers), for example, via client devices 108. Examples of IaaS systems are discussed with respect to FIGS. 5-9. The bare metal system 102 can include a combination of computing hardware that enables users to load configurations (e.g., images) that execute instructions directly on logic hardware (e.g., servers 104) without an intervening operating system.

In implementation, the bare metal system 102 enables users to create an image that is used to provision and manage compute hosts, known as instances. An image is a template of a hard drive and determines the operating system and other software for an instance. The images can be standard images or custom images designed as a server's 104 (within the bare metal system 102) instance boot disk, which can also be used to launch other instances and specify when to launch those instances. Users can create instances as needed to meet their compute and application requirements and the infrastructure configurations (or shapes) of the hardware running the images, for example, on one or more of the servers 104. After an instance is created, on one or more of the servers 104, the user can access the instance securely from their client device 108, restart it, attach and detach volumes, and terminate it when done with it. The bare metal system 102 uses images to launch instances.

Instances launched from an image can include any combination of customizations, configurations, software, etc. and the bare metal system 102 can run compute instances through one of the servers 104. The instances are run on a server 104 that is provided as a dedicated physical server access for that user. The instances can be associated with specific hardware shapes. A shape is a template that determines the number of CPUs, amount of memory, and other resources that are allocated to an instance. In some embodiments, the shapes can include any combination of standard shapes, dense I/O shapes, GPU shapes, HPC and optimized shapes. When a compute instance is created, a user can select the most appropriate type of instance for the desired applications based on available shapes and characteristics within the bare metal system 102, such as the number of CPUs, amount of memory, and network resources.

In some embodiments, the bare metal system 102 can include or otherwise be communicatively attached to one or more data stores 106 and other databases 110. The one or more data stores 106 and other databases 110 can include any combination of computing devices configured to store and organize a collection of data. For example, the one or more data stores 106 and other databases 110 can be a local storage device within the IaaS, a remote database facility, or a cloud computing storage environment. The one or more data stores 106 and other databases 110 can also include a database management system utilizing a given database model configured to interact with a user for analyzing the database data. In some embodiments, the one or more data stores 106 and other databases 110 can be allocated for different functions. For example, the one or more data stores 106 can be provided as part of the IaaS for access and usage by the users and the other databases 110 can be used by the IaaS to manage or operate the IaaS. For example, the other databases 110 can be used to store customer images (and data related thereto) that have been registered for use within the IaaS. In other embodiments, all data for use by the IaaS itself and for outside users can be stored in the one or more data stores 106 such that the one or more data stores 106 is not necessary.

Any combination of the servers 104, data stores 106, and client devices 108 can include a computing system with specialized software and databases designed for providing an image qualification service, in accordance with the present disclosure. The combination of hardware and software that make up the system 100 are specifically configured to provide a technical solution to a particular problem utilizing an unconventional combination of steps/operations to carry out aspects of the present disclosure. In particular, the system 100 is designed to execute a unique combination of steps to provide a novel approach to auto qualification of images within a bare metal IaaS.

Continuing with FIG. 1, the bare metal system 102 can include a combination of core components to carry out the various functions of the present disclosure. These components can be run on a dedicated server 104 or another hardware element. In accordance with an example embodiment of the present disclosure, the bare metal server 102 can include an auto-qualification engine 112 and patching engine 120. The auto-qualification engine 112 and patching engine 120 can include any combination of hardware and software configured to carry out the various aspects of the present disclosure. In some embodiments, the auto-qualification engine 112 is an auto-qualification service configured to crawl through all available images and booting the images for testing. Based on the results of the testing, the auto-qualification engine 112 can label the images as stable or unstable.

In some embodiments, the patching engine 120 can be configured to patch and/or update an image that is labelled as unstable. In some embodiments, the patching engine 120 can maintain a database of all registered images, all image patches/updates, and a historical record of how images have been patched and/or what changes were made to patch images. Using information provided in the patching database, users (e.g., customer users or administrative users) can create a new image from the old one or boot an instance of the old image, mount or logon to the new image, and install new kernel drivers or other software to patch existing blacklisted images. Details about the new image, and the installed new kernel drivers can be stored in the database (e.g., data store 106) for future use.

In some embodiments, the bare metal system 102 can include an isolated hardware configuration that the auto-qualification engine 112 is configured to boot the images on. The isolated hardware can include any combination of physical and virtual machines that are isolated from machines being provided for use by user images. For example, as depicted in FIG. 1, the isolated hardware can be a dedicated server 104a that is allocated for testing instead of as part of the IaaS servers 104. In some embodiments, the isolated hardware can be part of an isolated virtual cloud network (VCN), for example, on the server 104a. Regardless of isolated hardware configuration, the isolated hardware includes the new hardware configuration. The isolated hardware can include any number infrastructures, with any combination of hardware shapes, and with any number combination of "new" hardware to test images.

In accordance some embodiments, the plurality of client devices 108 can be configured to communicate with the bare metal system 102 over a public internet 116. The bare metal system 102 can act as IaaS for users accessing the client devices 108. The plurality of client devices 108 can include any combination of computing devices. For example, the plurality of client devices 108 can include any combination of servers, personal computers, laptops, tablets, smartphones, etc. In some embodiments, the computing devices 106 is configured to establish a connection and communicate over public internet 116 to carry out aspects of the present disclosure. The public internet 116 can include any combination of known networks, for example, as discussed with respect to the public internets of FIGS. 5-8. The public internet 116 can be used to exchange data between the computing devices 106 and the bare metal system 102.

Figure 2:
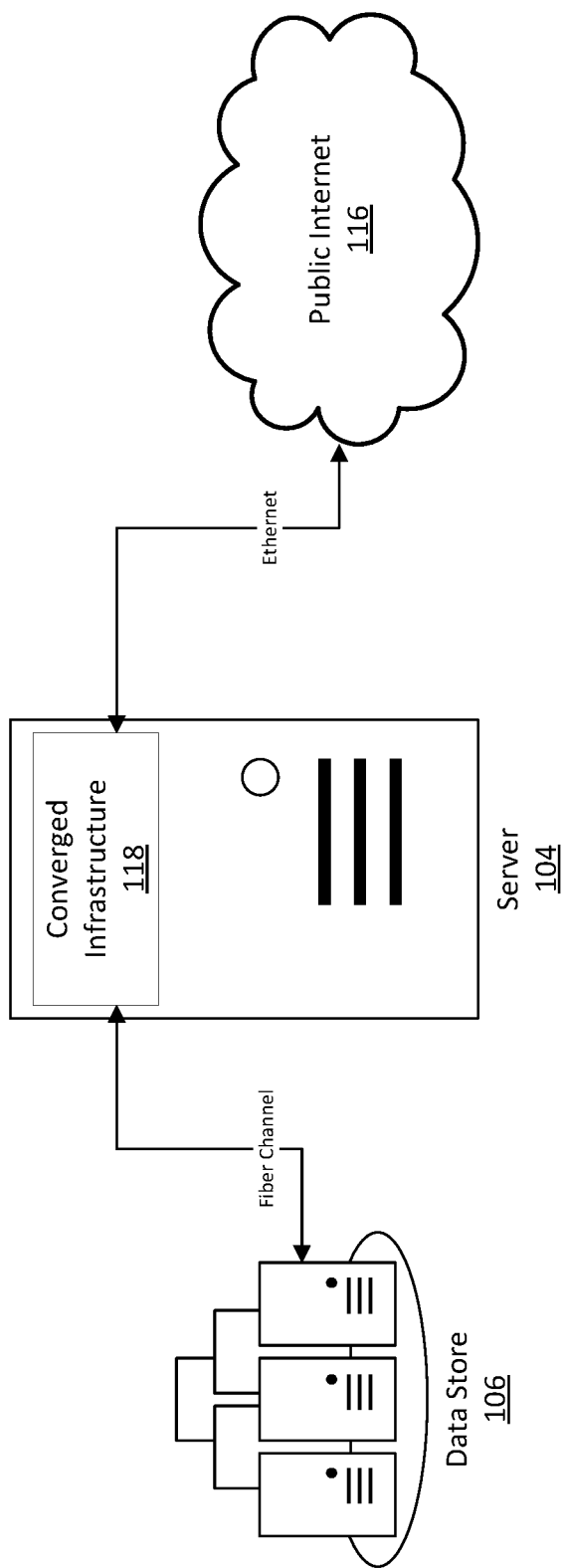
FIG. 2 is a block diagram illustrating a system for implementing the present disclosure, according to at least one embodiment.

Referring to FIG. 2, in some embodiments, at least some of the servers 104, within the bare metal system 102, can include or otherwise be communicatively coupled to converged infrastructure 118. Converged infrastructure 118 is any combination of hardware, software, and firmware that combines multiple components into a single computing package. Any combination of hardware, software, and firmware can be combined into a converged infrastructure. For example, as depicted in FIG. 2, the converged infrastructure 118 can be a converged network interface controller (or Converged I/O Accelerator or Converged Adaptor). The converged NIC can include a host bus adaptor (HBA) and a smart network interface controller (NIC). Each of the components on the converged NIC can have its own function, as if they were separate devices. For example, when implemented as separate cards, the HBA can be used for communicating with a data store 106 over a fiber channel while the smart NIC can communicate over an ethernet connection. Whereas, using the converged NIC, a single component can be used to communicate over both pathways by combining the functionality of the HBA and NIC.

When implemented in the server 104, the converged infrastructure 118 provides functionality to the host server 104 as well as to the client device 108 using the bare metal system 102. The converged infrastructure 118, however, provides a failure mode that may not occur with non-converged infrastructure. For example, a destabilized smart NIC portion of a converged NIC can also destabilize the workload of an operating system running on that server 104, such that was not previously possible in conventional systems that used separate smart NIC and HBA hardware. Ultimately, if the smart NIC fails in a way that causes user-visible devices to also fail, the bare-metal instance operating system may hang or crash. As discussed in greater detail herein, the present disclosure provides a system and method to auto recover from such hang ups in a way that avoids human intervention. Although the present disclosure discussed the use of a converge NIC, any combination of converged infrastructure 118 can be implemented without departing from the scope of the present disclosure. For example, the converged infrastructure 118 can include any combination of NIC, Storage Drive, GPU, etc. Using converged infrastructure 118 enables the bare metal system 102 to be able to handle offload of other input/output workloads, such as storage.

Figure 3:
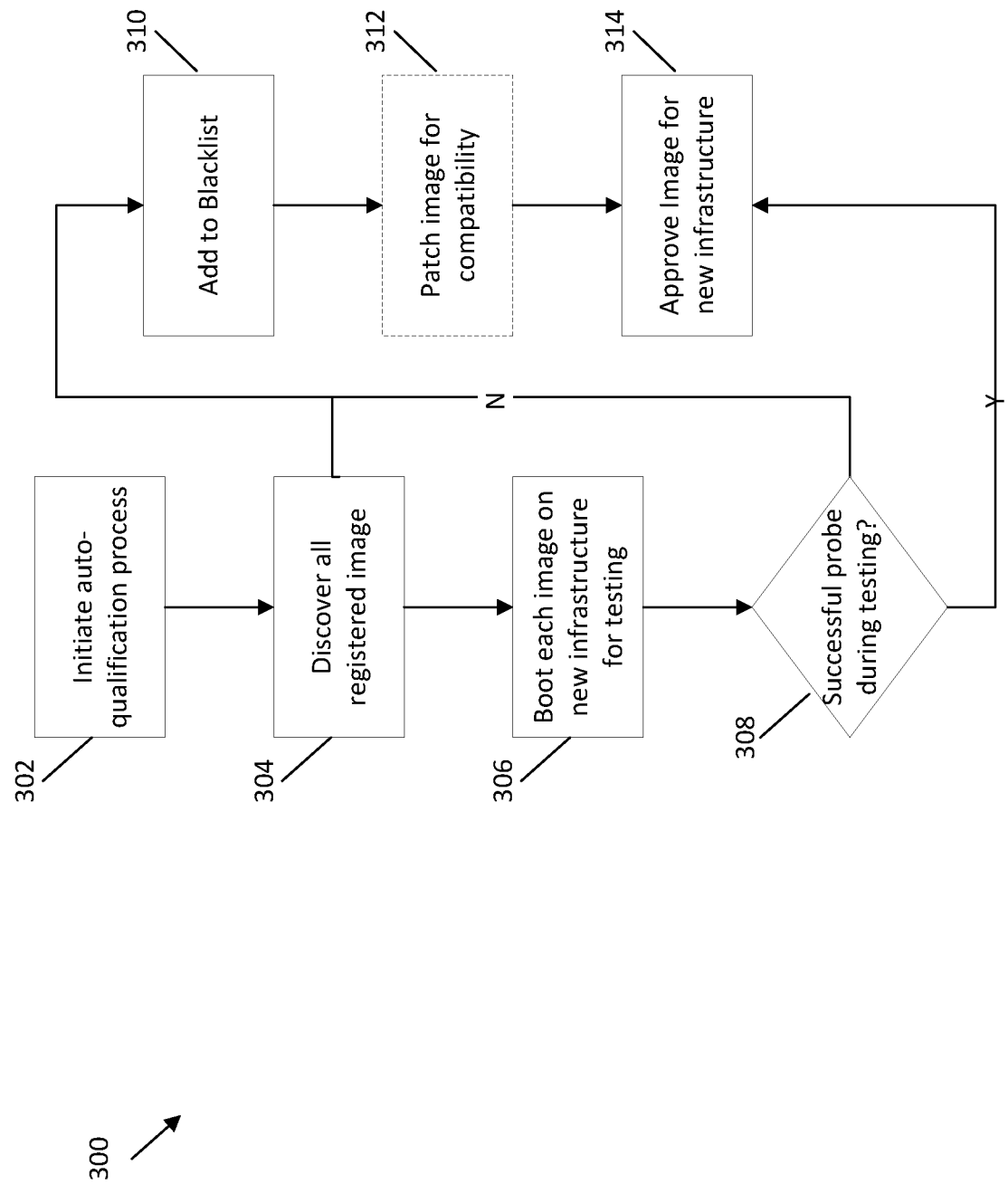
FIG. 3 is flowchart depicting a process implementing the present disclosure, according to at least one embodiment.

Referring to FIG. 3, an example process 300 for implementing aspects of the present disclosure is depicted. The process 300 is provided to perform auto-qualification of images for any new hardware configurations or shapes that may be added or transitioned to within an IaaS. The process provides steps to reduce or eliminate the likelihood that a customer (e.g., user) will experience a hard hand/crash due to infrastructure (e.g., converged infrastructure) misbehavior when the customer's image is transitioned to a new hardware shape. If crashes are prevented, then there is no chance that the customer's instance will end up in a reboot loop because the intended remediation from a reboot does not work.

Initially, a user can coordinate an IaaS with the bare metal system 102, for example, using a client device 108. As part of the IaaS on the bare metal system 102, the user can provide one or more images to be run on infrastructure provided by the can use a client device 108, for example, on a server 104. The image can be customized to the hardware elements provided within the server 104. In some embodiments, the server 104 can include converged infrastructure 118, for example, a converge NIC. As part of the customization, the user can perform lengthy testing and tweaking to the image to ensure that it operates in a stabilized manner. Thereafter, the user can access an instance of the image running on the bare metal system 102 in any manner that the user desires.

At step 302, an auto-qualification process is initiated, for example, by the auto-qualification engine 112. The auto-qualification can include pre-testing and pre-certifying customer images for use with new hardware prior to the new hardware being implemented. The auto-qualification process can be initiated in response to any combination of triggering events. For example, whenever an administrator of an IaaS introduces new servers, hardware configurations, shapes, etc. somewhere within the bare metal system 102.

The introduction of a new servers, hardware configurations, shapes, etc. can include introduction of a new infrastructure combination that has not been part of the system previously. For example, introduction of a new converged NIC that is different from other NICs or converged NICs that are already part of the system. The introduction of new infrastructure can also include introduction of a new combination of components that may operate differently than on previously existing infrastructure combinations. For example, a converged NIC could have been previously introduced on a server with an Intel processor, but a new configuration could be the same converged NIC introduced on a server with an AMD processor. Similarly, if an infrastructure was previously introduced and pre-qualified, it does not trigger the auto-qualification engine if the same infrastructure is introduced, even if it is new to the system 102. For example, if a particular server 104 with a particular infrastructure combination was previously qualified, adding a new server 104 with the same particular infrastructure would not need to be pre-qualified. In some embodiments, the new servers, hardware configurations, shapes, etc. can be installed but not enabled to be accessed by user images until after the auto-qualification process has been completed.

At step 304, all the images previously registered with the bare metal system 102 are discovered. The images can be discovered using any combination of methods. For example, the auto-qualification engine 112 can crawl through a combination of the data store 106 and/or database 110 for all images ever registered with the bare metal system 102. The images can be registered with an image service and the crawling can be through a listing all images registered in all regions. In some embodiments, an instance of the auto-qualification engine 112 can exist in each region where an image service exists. With an auto-qualification engine 112 instance in each region, separate API calls can be made to the image service in each region to retrieve the list of all images to test in that region. If there is only one global auto-qualification engine 112, then this service may need to go through the list of all regions, and for each region, request the list of all registered images in that region from the image service, and then run an auto-qualification workflow on a compute instance of each image aggregated from the various per-region image service endpoints.

In some embodiments, the images identified (e.g., through crawling) can be aggregated in a list for testing and sorted based on frequency of usage. The registered images can include a combination of images uploaded by customer users or present images configured and uploaded by the system administrator for the bare metal system 102. For example, customer users can upload images to an object store service and/or through an image registration service. In some embodiments, as part of the image registration, the image can include or be associated with an image key and a reference to a block to get an identifier. Upon registration, a user can grant the IaaS read access to fetch a binary large object (BLOB) for the image and place the image in storage. When registering a new image, the customer may give a loose indication of what type of server they are hoping to run on and/or test the image themselves. Initially, a customer may also select an "instance type" or "instance shape" which has an implied microarchitecture (e.g., x86_64, ARM64, etc.). In some embodiments, newly registered images can go through the pre-testing/pre-qualifying process as discussed in greater detail herein.

Continuing with step 304, as each of the images are discovered/identified, the images can be tagged or collected to be pre-tested/pre-qualified on an implementation of the new infrastructure. The pre-testing/pre-qualifying is performed to ensure that the image, including its operating system, operates on the new infrastructure configuration in a stable manner. In some embodiments, the auto-qualification engine 112 can check that the owner/creator of the image has granted permission to auto-qualify the images prior to performing any testing. For example, the owner/creator may be given an option to opt into an auto-qualification service to allow the system to preemptively (e.g., each time new hardware configurations are proposed or added elsewhere in the IaaS) auto-qualify their images. If the image does not enable permission for auto-qualification the images can be added to an unqualified list or the blacklist (by advancing to step 310). Blacklisting is to prevent attempts to spin-up compute instances from images known to not work on a specific server configuration. An image is either known-bad, unknown or known-good. Known-bad images get blacklisted and never get paired with the server configuration they are known to not work with. Known-good server-image pairings will always get used. Unknown server-image pairings will continue to carry the risk of potential instability until the customer tests them by booting them and seeing what happens (at which time the images will be tagged as known-good-due-to-customer-testing as opposed to known-good due to auto-qualification testing). Adding an image to an unqualified list or blacklist can include notifying the user using the image that it is not enabled for pre-qualification, and it may result in unexpected downtime in the event that it needs to be loaded on a new infrastructure configuration in the future.

At step 306, each discovered image is loaded, booted, spun up, etc. onto an instance of the new infrastructure for pre-testing/pre-qualification. The pre-testing/pre-qualification is designed to determine whether the image is stable to run on the new infrastructure. For example, when a new (e.g., converged NIC) is introduced to one or more of the servers 104, then a new infrastructure has been introduced and images should be loaded, booted, spun up, etc. thereon for pre-testing/pre-qualification. In some embodiments, pre-testing/pre-qualification can involve running an instance of an image to see if observable behaviour of the instance on a known good older server configuration is similar to the observable behaviour of an instance of that same image running on the newer infrastructure configuration. For instance, it is very common for most compute instances to attempt to access the Instance Metadata Service (IMDS) on boot. Instances usually fetch self-configuration data and intrinsic properties metadata from IMDS. Therefore, if an instance of the image under test is booted on an isolated server while listening for it to attempt to contact the IMDS, it can be inferred that the OS of the instance booted, networking was fully setup, and an agent inside the OS could successfully craft and send out requests for the instance's metadata. In this instance, this test (can the OS boot and fetch instance metadata) can be considered as passing.

In some embodiments, each discovered image can be loaded, booted, spun up, etc. on one or more instances within isolated virtual cloud network (VCN), for example, on the server 104a. The isolated VCN (or other similar implementation) can be used such that the image(s) currently being used on other preexisting infrastructure is not impacted by the testing and errors or failures caused by the pre-testing/pre-qualification.

In some embodiments, at least a portion of the new infrastructure (specify specific server, rack, etc.) being introduced can be reserved for dedicated image testing. For example, if multiple new servers 104 are introduced into the bare metal system 102, then each of the new servers 104 can be used for testing images, at least until some of the servers 104 enter service for use by one or more users (e.g., customers). If a new hardware infrastructure is introduced, it can be made available for use to customers once some percentage of the images passes testing on the new hardware. In some embodiments, each image can be booted into an isolated virtual cloud network (VCN) on a server that has the new hardware configurations/shapes installed. The use of VCN ensures that the image testing is not interfering with the other servers 104 supporting the user's IaaS.

In some embodiments, the discovered images can be sequentially loaded and tested on a single setup (infrastructure configuration/VCN) and/or they can be loaded and tested on multiple new infrastructures (VCN) of the same configuration. For example, each of the existing images can be booted onto a server having a converged NIC (combined host bus adaptor NIC and smart NIC on the same motherboard) to determine if the images are compatible with a converged NIC. In some embodiments, the auto-qualification engine 112 can prioritize testing of the most frequently used images first, for example, based on usage statistics. In some embodiments, to preserve the customer images, the auto-qualification engine 112 can register an independent copy of an image before attempting to do the auto-qualification. By creating a copy, the original version of the image is preserved while testing can be performed using the copy.

At step 308, the images are probed during the pre-testing/pre-qualification to see if the running instance of the images achieve full boot, connectivity and stability. For example, once an image is booted on the isolated hardware, the auto-qualification engine 112 (or VCN) can probe to see if the running instance achieves full boot, connectivity and stability without crashing or hanging up (e.g., kernel crash). In other words, the images can be loaded, booted, spun up, etc. to determine whether the image boots completely without having a kernel crash or other destabilizing effect. Based on the results of the probing, the image can be marked as stable or unstable, depending how the image performs on the new infrastructure configuration (i.e., converged NIC) on the isolated hardware. If the image is unstable or fails to boot completely, the process 300 can advance to step 310 so that the image can be blacklisted so that the system prevents placement of instances of that image on the new infrastructure. If the image is stable and boots completely, the process 300 can advance to step 314 so that the image can be approved for placement of instances of that image on the new infrastructure.

At step 310, images that are determined to be unstable and/or fail to boot completely, are added to a blacklist. Images can be added to the blacklist at the hardware/server configuration level or at a hardware component level (e.g., at the NIC or SSD level) with the result that any hardware configuration containing the new component should not accept a launch of the blacklisted image. When checking to determine whether an image is pre-qualified to run on a particular infrastructure configuration, the blacklist can be referenced. In some embodiments, blacklisted images also trigger a warning to the creator/owner of the image (e.g., in a console, in API responses, etc.) suggesting that the image is not fit for use on the new hardware shapes (e.g., servers using converged NICs). In response to a warning and/or notification that an image is placed on a blacklist, the customer may be given an option to request the system 102 attempt to patch the image when a patching path exists, as discussed in greater detail in step 312. In some embodiments, copies of the blacklisted images can be made prior to performing any patching. After reviewing the registered images and/or making copies of the incompatible registered images, the auto-qualification service can attempt to patch the incompatible image.

At step 312, if a patching option exists, an incompatible image is automatically patched to be compatible with the new infrastructure. The determination that an image can be patched can be performed using any combination of technique, for example, by comparing similar images to one another. For example, the patching can be performed using the process 400 discussed with respect to FIG. 4. If an incompatible image is successfully patched, it can be removed from the blacklist and approved for use on the new infrastructure. If no patching option exists, the incompatible image can remain blacklisted.

At step 314, images approved for the new infrastructure are identified and stored in an image database. In some embodiments, the system 102 can monitor images and notify users images are old and should be retired. By marking an image as retired, that image can be removed from having to be run through the auto-qualification process 300. The retirement of an image can be determined based on any combination of factors. For example, the retirement of an image can be based on the last time the image was used, a support lifespan for a given image, frequency of use for the image, etc. In some embodiments, the retirement can be based on a sliding scale. The sliding scale can be configured such that it provides a sliding time period that establishes the lifetime of an image. For example, the scale can be a period of five years, such that after five years has passed, an image will no longer be within the compatibility window. The sliding scale provides users with a predetermined period of time in which they are aware that the image will be useable within the IaaS before it would be required to be updated or replaced. Any images fall out of the sliding scale would no longer need to be run through the auto-qualification process 300. In some embodiments, the system 102 can notify users (e.g., via client device 108) that have older images beyond a certain period (e.g., relying on obsolete hardware) will no longer support or they should update to a newer image to accommodate newer hardware.

Figure 4:
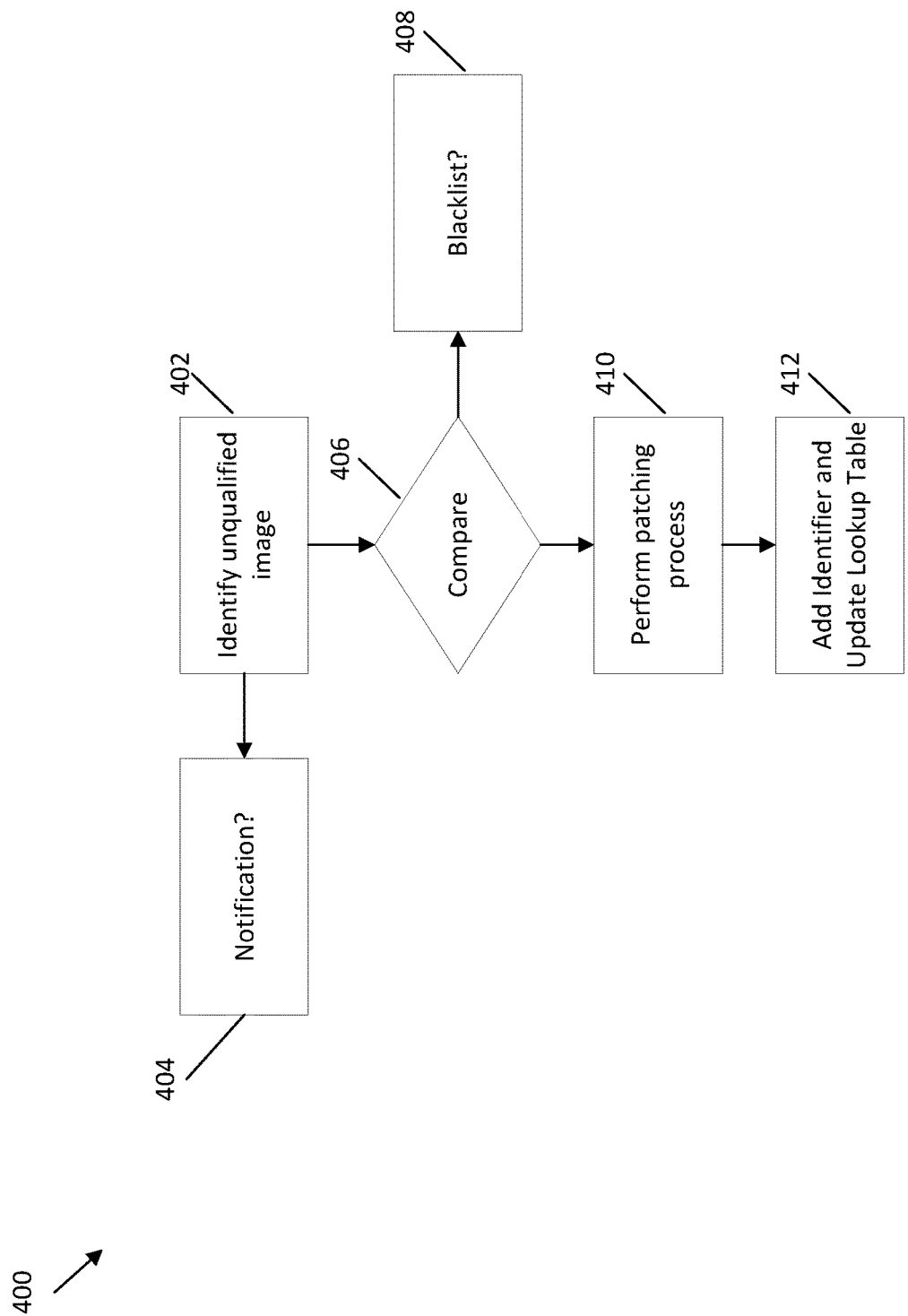
FIG. 4 is flowchart depicting a process implementing a cloud infrastructure as a service system, according to at least one embodiment.

Referring to FIG. 4, an example process 400 for implementing aspects of the present disclosure is depicted. The process 400 is provided to perform patching of incompatible images for any new hardware configurations or shapes that may be added or transitioned to within an IaaS. The patching process 400 can be performed using any combination of components, such as for example, the patching engine 120. The process 400 provides steps to reduce or eliminate the likelihood that a customer (e.g., user) will experience a hard hand/crash due to infrastructure (e.g., converged infrastructure) misbehavior when the customer's image is transitioned to a new hardware shape.

At step 402, the process 400 identifies an unregistered or incompatible image. The unregistered or incompatible image can be identified through any combination of steps. For example, the identification can be in response to a user uploading a new unqualified image, in response to a new infrastructure being introduced into the system 100, or in response to an image failing to be auto-qualified (e.g., from step 310 of FIG. 3). In some embodiments, the identification can include determining whether an image is out of date, such as beyond a predetermined period of time. The identification can be performed using any combination of methods. For example, any time a new image is uploaded/registered, a new infrastructure configuration is implemented, or anytime an image is added to a blacklist, a comparison process can be performed to determine if an equivalent or identical copy of the new image/infrastructure already exist. The comparison process can include comparing the unregistered or incompatible image to all previously qualified images. Similarly, the comparison process can be a comparison of the new infrastructure configuration against infrastructures previously qualified for existing images. If an equivalent or identical copy of the new image/infrastructure does not already exist (e.g., within a data store 106), then the process can advance to step 406, otherwise the process can end.

At step 404, optionally if an existing image is out of date, the process 400 provides a notification to a customer/user that their image is out of date and needs to be updated to operate properly on the infrastructure within the system 102. The notification can include a recommended action(s) to update the image. For example, the system 102 can suggest an alternate image that is similar to a user's current image but is known to work since it has been updated to work with new hardware configurations. The notification and recommendations can be provided through any communication method. For example, they can be provided via email, text message, instant message, console message, etc.

At step 406, the process 400 can compare the unregistered or incompatible image against qualified images to determine if a patching option exists. In some embodiments, an unqualified image can be compared against all or parts the images in the database, including all registered images, all image patches/updates, and a historical record of how images have been patched and/or what changes were made to patch images. The comparisons can include comparing listings of all installed software, version info, checksums for key files, etc. with known listings to see if any match (excluding the missing patch updates that would render an old image usable on new hardware). In another example, the patching engine 120 can also traverse the file systems and do a directory-by-directory and file-by-file comparison to compute the extent of difference between two mounted images and to determine if any of the images are sufficiently similar to one another. Two images can be sufficiently similar if the OS-vendor-provided packages and files are of the same versions. In some embodiments, the versions do not have to be identical, but must provide equivalent functionality on the same hardware component that was changed. If no sufficiently similar images are identified, then the process 400 can advance to step 408, where the image is blacklisted (e.g., as discussed with respect to step 310 of FIG. 3).

At step 408, if an image is derived from another image that the process 400 is familiar with (e.g., sufficiently similar to one another), then the process 400 can apply a patching process to the unregistered or incompatible image. Patching options can be determined using any combination of factors. For example, if a determination is made that an incompatible image is related to an image that has previously been approved for new infrastructure/hardware shape, the approved image may be used to patch the incompatible image. In another example, when the images are similar but have different drivers, the previously approved image can be used to update the drivers of the incompatible image.

At step 412, if a successful path has been made, patched images can be associated with an identifier, tracked, and stored for future use. As such, any successful patching will result in a new operating system image that has a new identifier. In some embodiments, the process 400 can update a lookup table associating old image identifiers with the unregistered or incompatible versions of the image with the identifiers of the patched images that are compatible with new hardware. The lookup table can be stored in a database (e.g., data store 106) that includes identifiers for each old/unregistered or incompatible images with the new patched or equivalent versions of previously qualified images. In some embodiments, once an image is updated or replaced to be pre-qualified/compatible, the image reference within the user's configuration can be updated to use the identifier of the patched or equivalent versions of previously qualified images, thus replacing the original image (e.g., the unregistered or incompatible image). For example, a reference for the identifier of the old image can be updated to point to the identifier of the new patched image.

While the operations of processes 300 and 400 are described as being performed by generic computers, it should be understood that any suitable device may be used to perform one or more operations of this process. Processes 300 and 400 (described above) is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes 300 and 400.

In some embodiments, a user can be prompted and/or otherwise select an option for auto-patching an image pre-emptively (e.g., each time new hardware configurations are proposed or added elsewhere in the IaaS) if the image becomes incompatible with the infrastructure of the system 102. If the user elects to have auto-patching, then the image can be automatically updated to be compatible with the new infrastructure configuration and/or a new image can be automatically created that is compatible with the new infrastructure configuration. In some embodiments, the first boot process of all instances of the incompatible image can have a modified workflow that applies the patch before the instance is fully up, when auto-patching is enabled. Note that this type of patching does not patch the original image from which this running bare metal instance was created, but instead it modifies the running instance one time to be able to run on the new instance, taking a backup snapshot before the patching in case we need to revert the patch. In this case, the original image the instance was created from does not get patched. For example, when an infrastructure maintenance event affects bare metal instances, an infrastructure reboot can be initiated to migrate supported bare metal instances from the physical host that needs maintenance and/or is obsolete to a healthy host which can include new infrastructure (e.g., converged NIC). A short downtime may occur during the migration. Note that the customer may opt to snapshot the now instance's now patched OS image and create a new image from it. This new snapshot image created from the patched OS image of the migrated bare metal instance will have metadata recorded for it showing that it is whitelisted for both the old hardware configuration and the new hardware configuration since it has been patched to work with new hardware configuration.

In some embodiments, any OS patching configured to work on new hardware will maintain backward compatibility, so the new image created by patching an old image will still be able to run on old hard hardware it used to run on. When a customer updates their configuration to use the new image, the customer can get the same customer-visible behaviour they are used to, whether running on a new hardware configuration or the older one. Customers can also launch an instance by specifying the identifier of the image they wish to use (old one or new one) and can specify the instance shape or type they want. Instance shapes/types can map to several different hardware configurations that appear to act the same way if the image is patched to be able to work on all those various hardware configurations.

In some embodiments, the image of a launched instance will be inspected by the system to see if any of the available hardware configurations is incompatible with the image being used to launch the instance. Incompatible servers (those with incompatible hardware configuration) can be dropped from consideration and the customer instance can be launched if there is any server left to place their instance on. If no server left, the customer instance will not be launched. If an image is whitelisted against all the configurations, no server will be dropped from consideration and the customer's instance will have the highest likelihood of being placed and fully launched.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
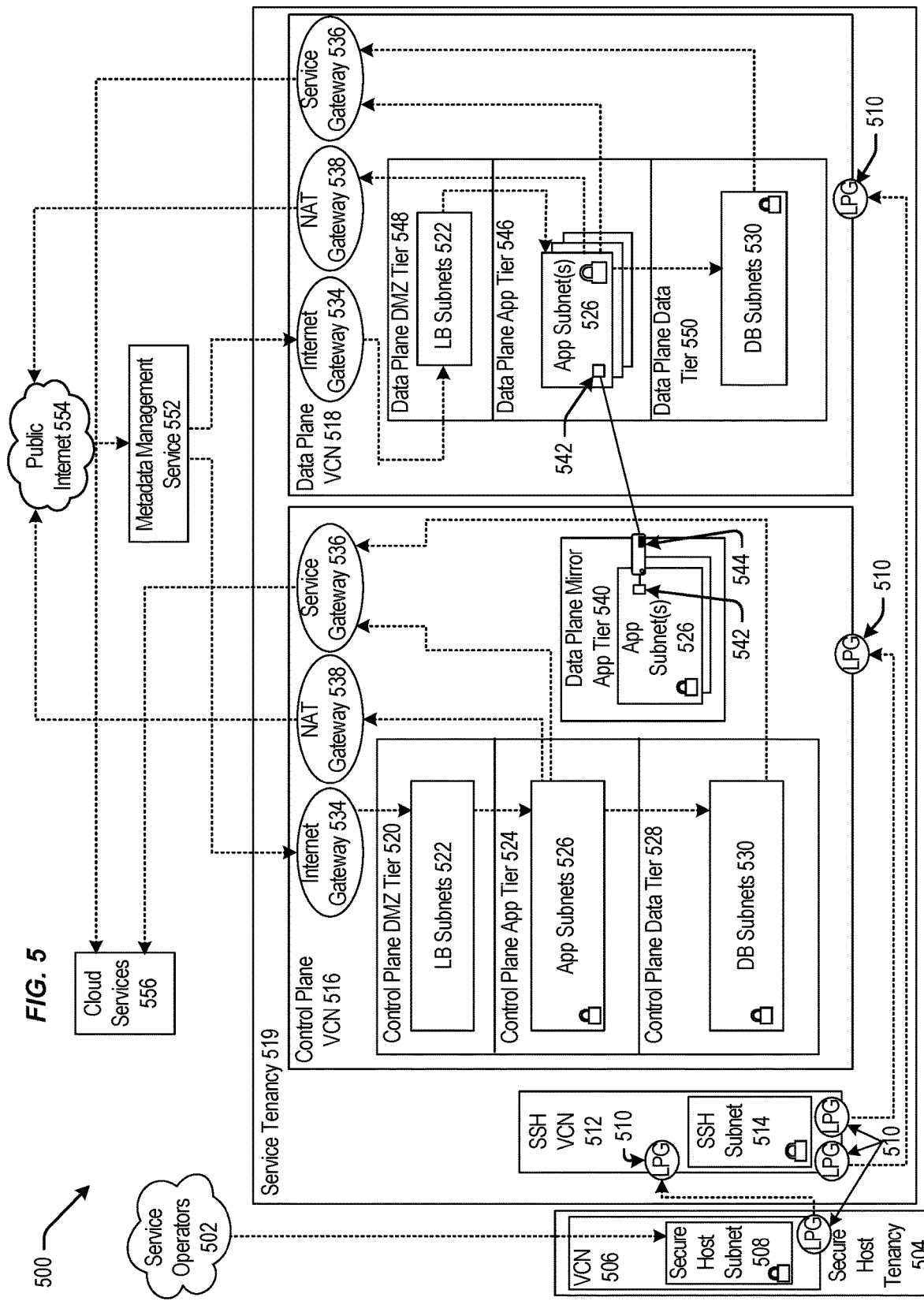
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
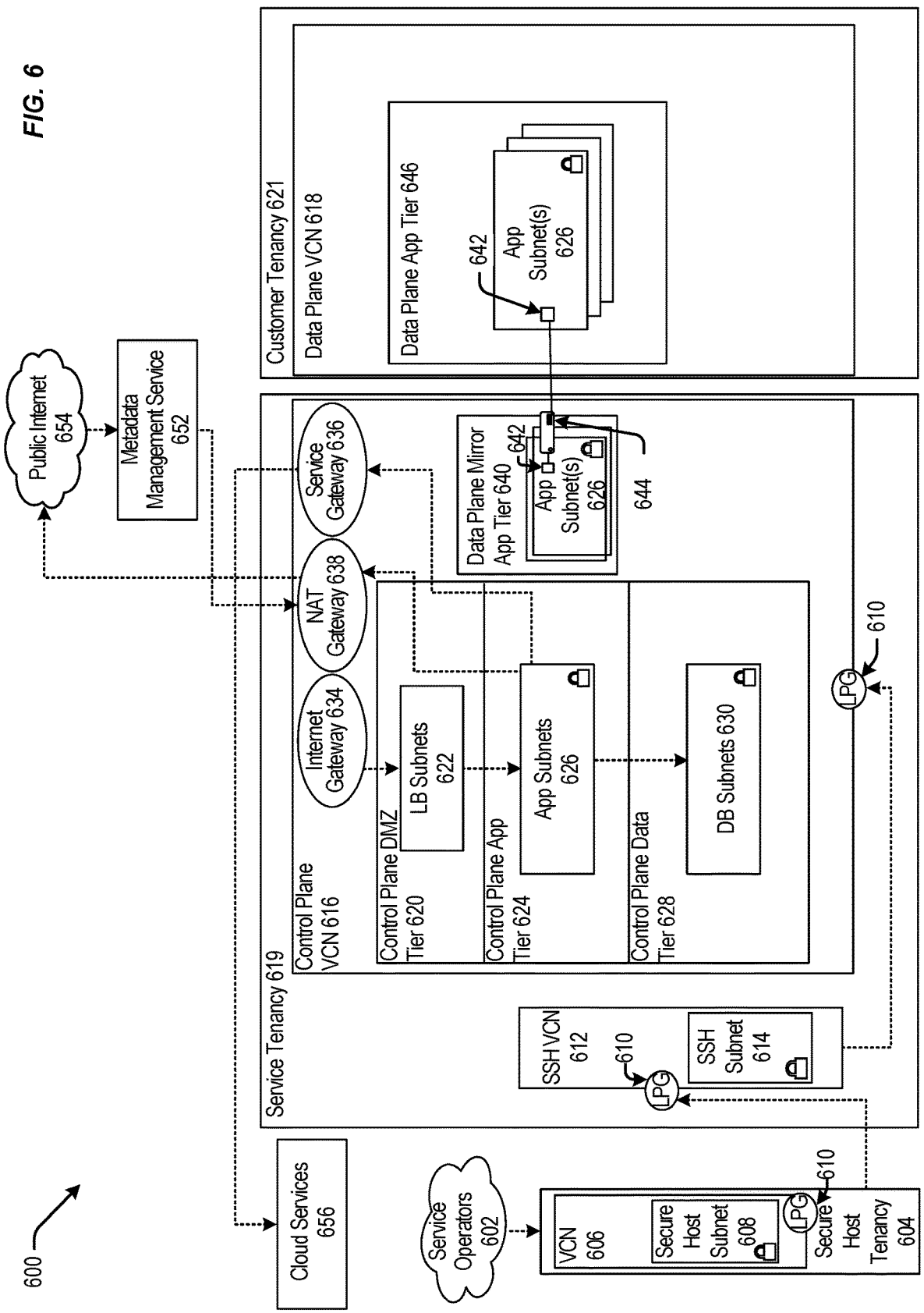
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
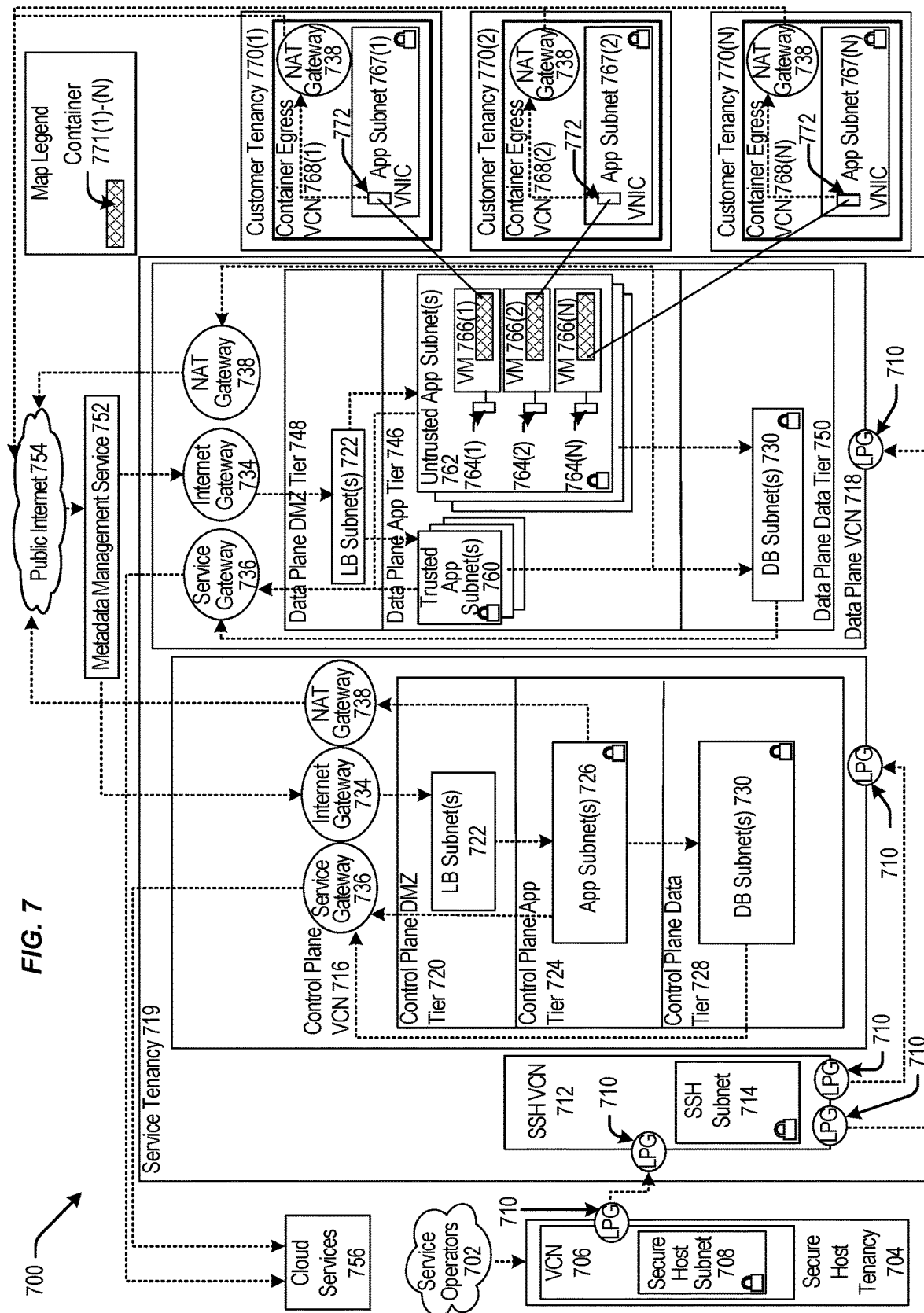
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
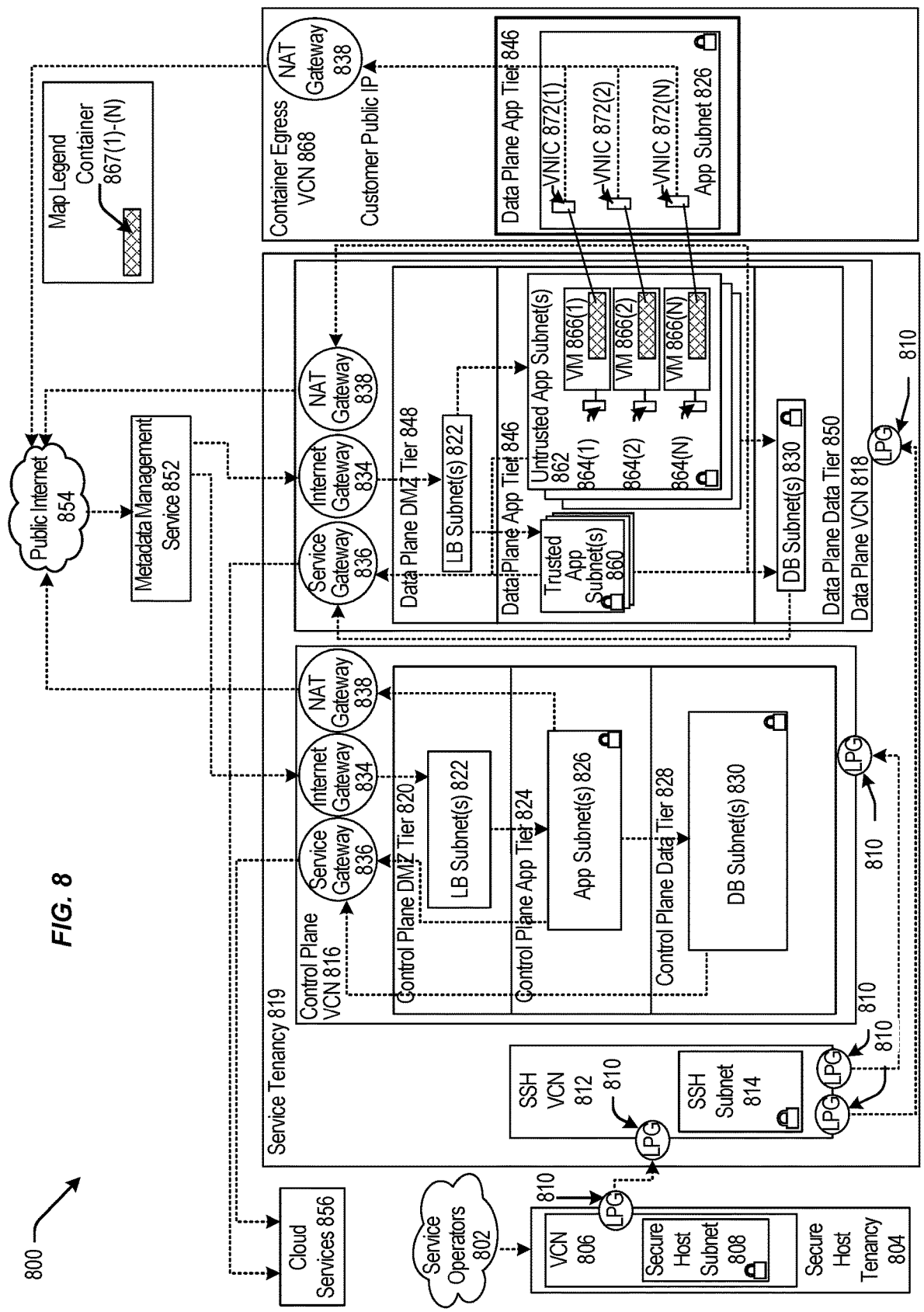
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
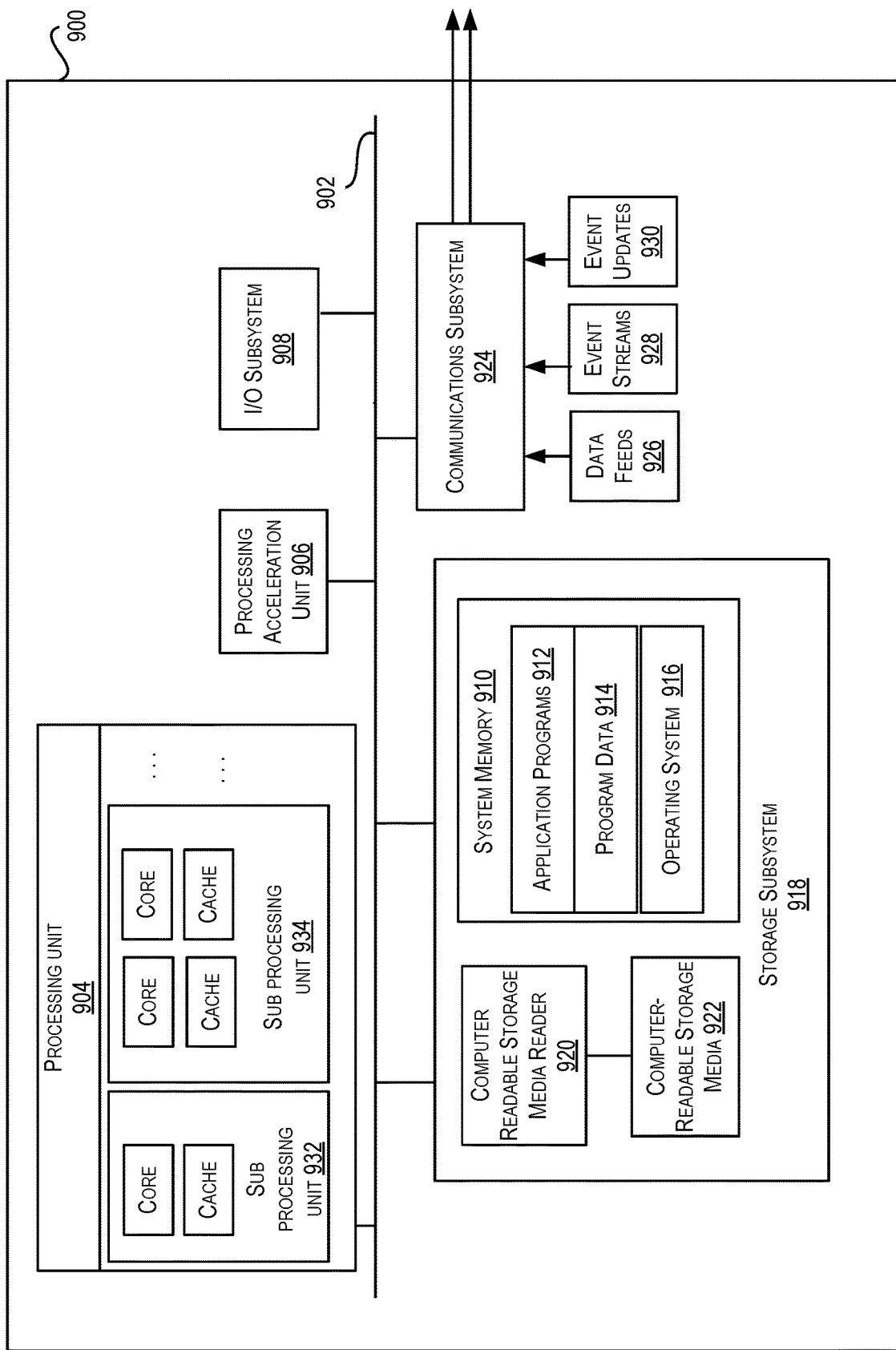
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    detecting, by a bare metal system comprising a converged network interface controller (NIC), one or more new infrastructure configurations introduced into the bare metal system;
    initiating, by the bare metal system, an auto-qualification process for pre-testing one or more images registered within the bare metal system having the one or more new infrastructure configurations;
    discovering, by the bare metal system, all of the one or more images registered for use within the bare metal system;
    booting, by the bare metal system, each of the one or more registered images into an isolated infrastructure having the one or more new infrastructure configurations;
    probing, by the bare metal system, instances of each of the one or more registered images booted on the isolated infrastructure to determine stability of each of the one or more registered images on the one or more new infrastructure configurations; and
    marking, by the bare metal system, each of the one or more registered images as stable or unstable.

2. The method of claim 1, wherein the isolated infrastructure is part of a Virtual Cloud Network (VCN).

3. The method of claim 2, wherein the VCN comprises a dedicated pool of hardware for the auto-qualification process.

4. The method of claim 1, wherein images identified as unstable are added to a blacklist that prevents placement of instances of the images identified as unstable from being run on the one or more new infrastructure configurations.

5. The method of claim 1, further comprising patching, by the bare metal system, each of the one or more registered images identified as unstable.

6. A system, comprising:
    one or more processors; and
    a memory coupled to the one or more processors, the memory configured to store a plurality of instructions executable by the one or more processors and when executed by the one or more processors cause the one or more processors to at least:
        detect, by a bare metal system comprising a converged network interface controller (NIC), one or more new infrastructure configurations introduced into the bare metal system;
        initiate an auto-qualification process for pre-testing one or more images registered within the bare metal system having the one or more new infrastructure configurations;
        discover all of the one or more images registered for use within the bare metal system;
        boot each of the one or more registered images into an isolated infrastructure having the one or more new infrastructure configurations;
        probe instances of each of the one or more registered images booted on the isolated infrastructure to determine stability of each of the one or more registered images on the one or more new infrastructure configurations; and
        mark each of the one or more registered images as stable or unstable.

7. The system of claim 6, wherein the isolated infrastructure is part of a Virtual Cloud Network (VCN).

8. The system of claim 7, wherein the VCN comprises a dedicated pool of hardware for the auto-qualification process.

9. The system of claim 6, wherein images identified as unstable are added to a blacklist that prevents placement of instances of the images identified as unstable from being run on the one or more new infrastructure configurations.

10. The system of claim 6, further comprising patching each of the one or more registered images identified as unstable.

11. A non-transitory computer-readable memory storing a plurality of instructions executable by one or more processors, the plurality of instructions comprising instructions that when executed by the one or more processors cause the one or more processors to perform operations comprising:
    detecting, by a bare metal system comprising a converged network interface controller (NIC), one or more new infrastructure configurations introduced into the bare metal system;
    initiating, by the bare metal system, an auto-qualification process for pre-testing one or more images registered within the bare metal system having the one or more new infrastructure configurations;
    discovering, by the bare metal system, all of the one or more images registered for use within the bare metal system;
    booting, by the bare metal system, each of the one or more registered images into an isolated infrastructure having the one or more new infrastructure configurations;
    probing, by the bare metal system, instances of each of the one or more registered images booted on the isolated infrastructure to determine stability of each of the one or more registered images on the one or more new infrastructure configurations; and
    marking, by the bare metal system, each of the one or more registered images as stable or unstable.

12. The non-transitory computer-readable memory of claim 11, wherein the isolated infrastructure is part of a Virtual Cloud Network (VCN) comprising a dedicated pool of hardware for the auto-qualification process.

13. The non-transitory computer-readable memory of claim 11, wherein images identified as unstable are added to a blacklist that prevents placement of instances of the images identified as unstable from being run on the one or more new infrastructure configurations.

14. The non-transitory computer-readable memory of claim 11, further comprising patching, by the bare metal system, each of the one or more registered images identified as unstable.

* * * * *